(No Model.) 2 Sheets—Sheet 2.

O. H. JEWELL.
WATER FILTER AND PURIFIER.

No. 377,387. Patented Feb. 7, 1888.

Witnesses,
W. Rossiter
Otto Lubkert

Inventor
Omar H. Jewell
By Wm. H. Lotz
Atty.

UNITED STATES PATENT OFFICE.

OMAR H. JEWELL, OF CHICAGO, ILLINOIS.

WATER FILTER AND PURIFIER.

SPECIFICATION forming part of Letters Patent No. 377,387, dated February 7, 1888.

Application filed June 11, 1887. Serial No. 240,972. (No model.)

*To all whom it may concern:*

Be it known that I, OMAR H. JEWELL, a citizen of the United States of America, residing at Chicago, in the county of Cook and State of Illinois, have invented certain new and useful Improvements in Water Filters and Purifiers, of which the following is a specification, reference being had therein to the accompanying drawings.

This invention relates to devices for filtering and purifying water to make it suitable for feeding steam-boilers and healthful for drinking and cooking purposes; and it has for its object to provide an apparatus that by filtering and by the automatic admixture of chemicals will clarify the most impure water, and also in devices in connection therewith for washing out such apparatus from time to time for removing the impure sediments collected therein; and with these objects in view my invention consists of the novel devices and combinations of devices hereinafter described and specifically claimed.

Figure 1:
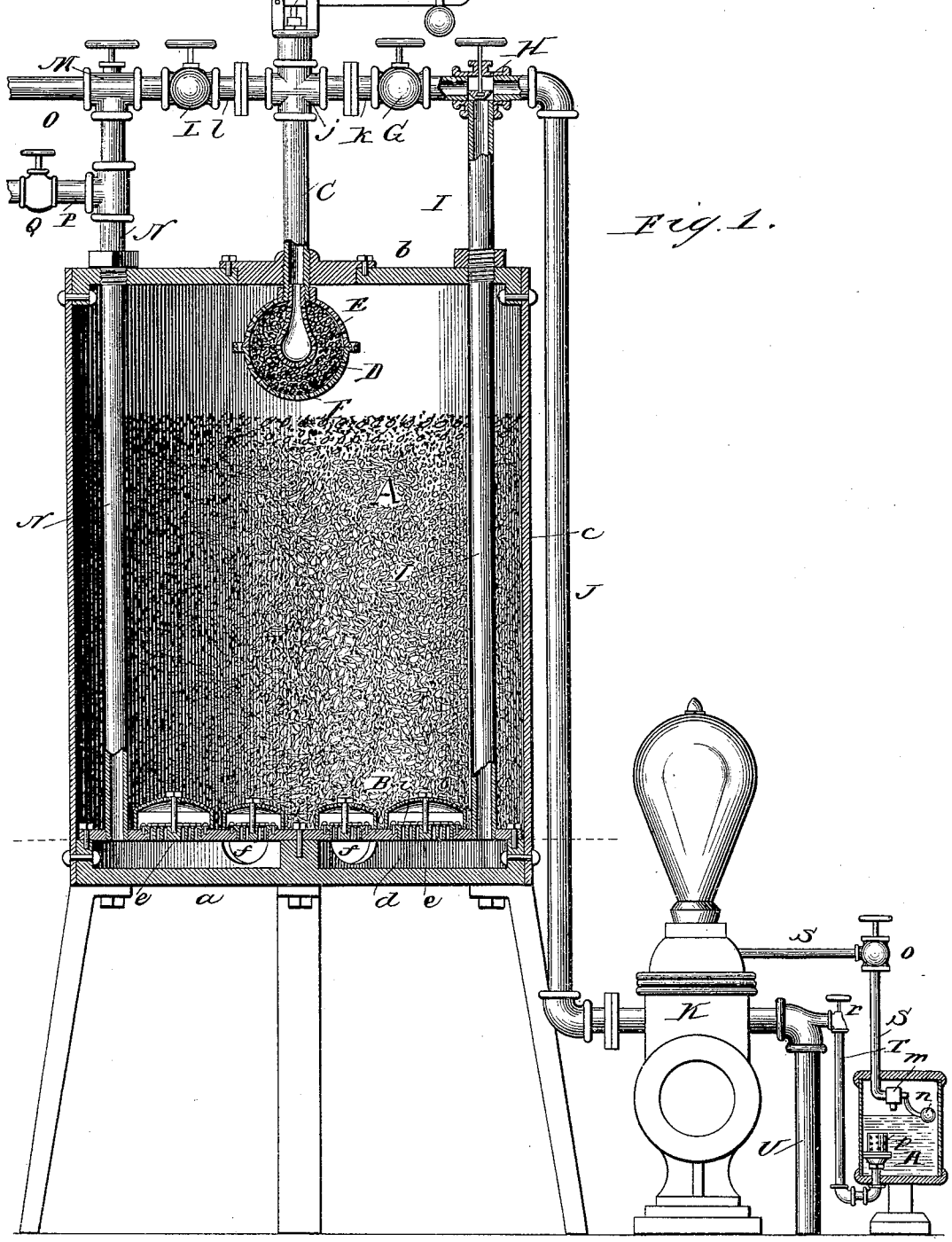
Figure 2:
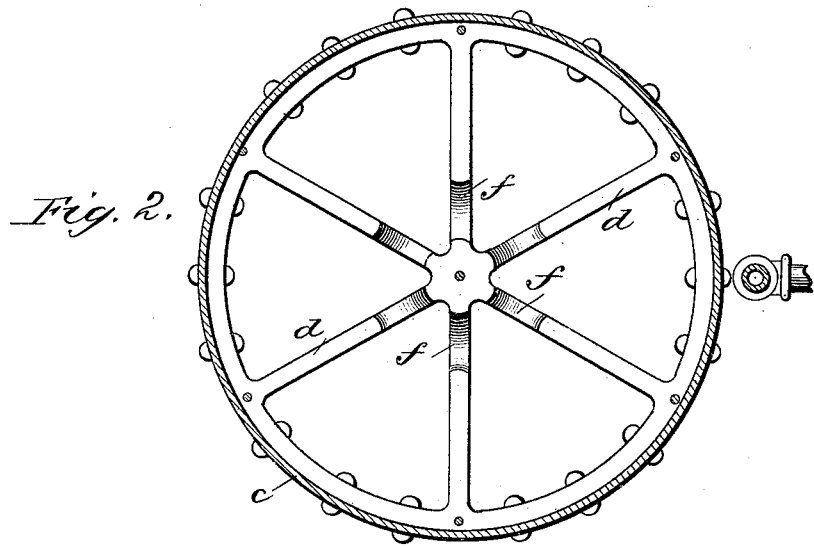
Figure 4:
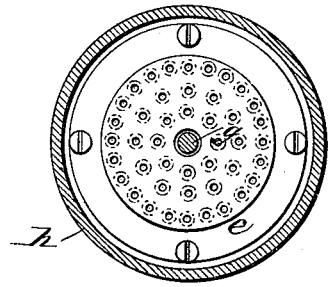
Figure 3:
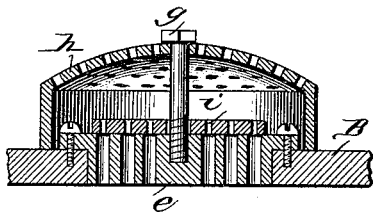
Figure 5:
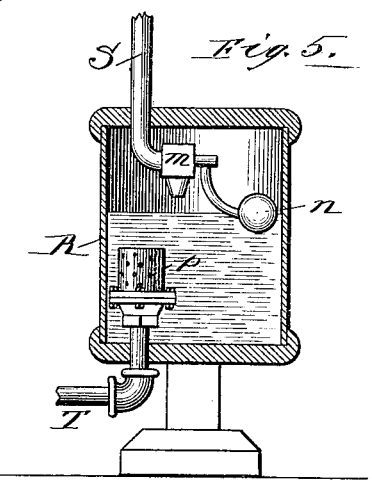

In the accompanying drawings, Figure 1 represents a sectional elevation of the entire apparatus; Fig. 2, a top view of the bottom plate of the filtering-tank; Fig. 3, a vertical section, and Fig. 4, a sectional plan, of one of the bottom strainers; and Fig. 5 an enlarged sectional elevation of the alum-tank.

Corresponding letters in the several figures of the drawings designate like parts.

A denotes the tank, consisting of circular cast plates $a$ and $b$, secured in the top and bottom of the cylindrical sheet-metal shell $c$. The bottom plate, $a$, is provided with radial ribs $d$, upon which and upon its circumferential flange is secured by screws the false bottom B, having a series of circular openings for inserting the perforated plates $e$, each having an annular flange which, by screws, is secured upon plate B. The segmental chambers between plates $a$ and B communicate through semicircular notches $f$ of ribs $d$. Over each plate $e$ is secured, by a screw-bolt, $g$, a perforated cap, $h$, and this screw-bolt $g$ also serves as a guide for a disk, $i$, perforated with much smaller holes than plate $e$ and cap $h$.

Through the center of top plate, $b$, of tank A is projected a pipe, C, having secured in its end a rose-head, D, which again is inclosed by two semi-spherical perforated shells, E, that combined form a globe-shaped strainer, and the space between the rose-head D and shells E is to be filled with gravel. The pipe C is coupled with its upper end to a cross-coupling, $j$, having to its top a safety-valve, F, of any usual construction. One of the horizontal nozzles of such coupling $j$ is connected, through pipe K, with valve G, again connecting with a valve, H, from which one pipe, I, is projected through plates $b$ and B of tank A, to communicate with the chamber between plates $a$ and B, while another pipe, J, connects with the discharge-valve chamber of steam-pump K. The opposite horizontal nozzle of coupling $j$ is connected through pipe $l$ with valve L, again connecting with valve M, from which one pipe, N, is again projected through plates $b$ and B to communicate with the chamber between plates $a$ and B, while another pipe, O, communicates with the sewer or other waste-offlet. Intermediate of valve M and the top of tank A the pipe N has coupled, by a T-coupling, a pipe, P, provided with a valve, Q, and leading into a reservoir, from which pure water is to be drawn as required.

The tank A being filled with gravel and sand and the valves H, L, and M being closed, while the valves G and Q are opened, the pump K will force water through pipe J, and thence through valve G and pipe C, and through strainers D and E, into tank A, in which, after filtering through the gravel, the water will escape through strainers $h$ $i$ $e$ into the chamber between plates $a$ and B, and will thence rise through pipe N, to be discharged through pipe P into the reservoir.

The filtering-tank requiring washing out from time to time for removing the refuse or impurities collecting therein, the arrangement is such that the flow of the water can be reversed by closing valves G, M, and Q, while the valves H and L are opened, when the water from the pump will pass through pipes J and I into the chamber between plates $a$ and B, and will thence pass through strainers $e$, $i$, and $h$ into tank A, passing upward therein, and thence escaping through strainers E D and through pipes C O into the sewer. After thus being washed out the valves H and L are closed again and the valve G is opened for water to filter through the tank on its regular down course, but to escape into the sewer through pipe O until such impurities that may have collected in the bottom of the tank during the reversing of the current are all washed away again and the water shows to be perfectly pure, when valve M is closed and valve Q is opened for leading the filtered water into the reservoir.

The rose-head D and globular strainer E will provide a large perforated surface not easily choked by refuse from the water, and by being packed with gravel in the manner specified they will retain the coarse impurities.

The caps $h$ form guards against coarser pieces of gravel coming into contact with the strainer-plates $i$, that, with reversing the current through the tank, will be lifted from the pressure of the water to clear the coarser perforations in plates $e$ for a more thorough washing out of these parts.

A tank, R, having a loosely-fitted easily-removable cover, is placed near the pump K, and the discharge-valve chamber of this pump communicates with tank R through a pipe, S, projected through the top thereof, where at its ends it is provided with a faucet, $m$, automatically regulated by a float, $n$, and this pipe S is also provided with a stop-cock, $o$. Another pipe, T, provides communication between suction-pipe V of pump K and tank R, through the bottom of the latter of which and through a perforated cup, $p$, attached to the end of pipe T. This pipe T is also provided with a stop-cock, $r$.

Alum or other suitable chemicals being filled into tank R through a suitable screw-plug, and both cocks $s$ and $r$ being turned open, the pump with each stroke will force a small stream of water through pipe S into tank R, until such quantity is collected therein as controlled by float $n$. The alum being slowly dissolved by the water, a regular quantity of the solution will be drawn into the pump K, through pipe T, with each stroke thereof, and by the commotion in passing through the pump and pipe it will be thoroughly mixed with the water. The quantity of the solution of alum thus to be fed into the pump is regulated by stop-cock $r$. The alum thus intermixed will precipitate all slimy impurities contained in the water.

What I claim is—

1. In an apparatus for the purpose described, the filtering-tank A, having false bottom with perforated plates $e$, with caps $h$, secured by bolts $g$, and with perforated plates $i$, guided on bolts $g$, all substantially as set forth.

2. The combination, with a filtering-tank and a pump, K, of tank R, communicating with the discharge-chamber of the pump through pipe S, having valve $m$, with float $n$, and communicating with the suction-pipe V of the pump through pipe T, having valve $r$ and perforated cup $p$, all substantially as and for the purpose set forth, to operate as specified.

In testimony whereof I affix my signature in presence of two witnesses.

OMAR H. JEWELL.

Witnesses:
 WILLIAM H. LOTZ,
 OTTO LUBKERT.